(12) United States Patent
Benedetti et al.

(10) Patent No.: US 8,800,242 B2
(45) Date of Patent: Aug. 12, 2014

(54) FASCIA BRACKET WITH QUARTER TURN LOCKING NUT

(71) Applicant: Newfrey LLC, Newark, DE (US)

(72) Inventors: Steven M. Benedetti, Sterling Heights, MI (US); Patricia E. Patt, Harrison Township, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 14/012,057

(22) Filed: Aug. 28, 2013

(65) Prior Publication Data

US 2013/0340211 A1    Dec. 26, 2013

Related U.S. Application Data

(62) Division of application No. 13/206,790, filed on Aug. 10, 2011, now Pat. No. 8,544,236.

(51) Int. Cl.
 *E04C 2/38* (2006.01)
(52) U.S. Cl.
 USPC ...................................................... 52/716.6
(58) Field of Classification Search
 CPC .......... F16B 5/128; F16B 21/02; F16B 21/09; F16B 5/00; F16B 5/12; F16B 5/123; F16B 5/125
 USPC .......... 52/716.1, 716.5, 716.6, 716.8, 718.01, 52/718.04, 718.05, 718.02, 718.03, 52/717.03, 717.04, 717.05, 717.06
 See application file for complete search history.

(56) References Cited

U.S. PATENT DOCUMENTS

| | | | |
|---|---|---|---|
| 2,258,668 A | 10/1941 | Zahodiakin | |
| 2,605,871 A | 8/1952 | Kress et al. | |
| 2,610,375 A | 9/1952 | Churchill | |
| 2,788,100 A | 4/1957 | Landell | |
| 3,120,686 A | 2/1964 | Pickering | |
| 3,123,389 A | 3/1964 | Biesecker | |
| 3,239,988 A | 3/1966 | Meyer | |
| 3,246,440 A | 4/1966 | Meyer | |
| 3,298,145 A | 1/1967 | Minervini et al. | |
| 3,411,262 A | 11/1968 | Meyer | |
| 3,664,073 A | 5/1972 | Tucker | |
| 3,700,206 A | 10/1972 | Jones | |
| 3,764,729 A | 10/1973 | Kowalewski | |
| 3,766,697 A | 10/1973 | Jackson | |
| 3,811,154 A | 5/1974 | Lindeman et al. | |
| 3,986,780 A | 10/1976 | Nivet | |
| 4,007,516 A | 2/1977 | Coules | |

(Continued)

FOREIGN PATENT DOCUMENTS

EP           2557319 A2 *   2/2013
FR           2 494 788      5/1982

OTHER PUBLICATIONS

European Search Report for Appl'n. No. EP 12 17 9387; Sep. 2, 2013; 2 pp.

*Primary Examiner* — Mark Wendell
*Assistant Examiner* — Keith Minter
(74) *Attorney, Agent, or Firm* — Harness, Dickey & Pierce, P.L.C.

(57) ABSTRACT

A system for coupling a trim component to a body component having two generally perpendicular surfaces. A rotatable fastener is coupled to the trim component. The rotatable fastener has a plurality of force transmitting surfaces.

10 Claims, 12 Drawing Sheets

(56) References Cited

U.S. PATENT DOCUMENTS

| | | | | |
|---|---|---|---|---|
| 4,213,230 A | * | 7/1980 | Hoen | 24/580.1 |
| 4,422,222 A | * | 12/1983 | Notoya | 24/614 |
| 4,599,768 A | * | 7/1986 | Doyle et al. | 24/594.11 |
| 4,674,247 A | * | 6/1987 | Hayashi et al. | 52/208 |
| 4,810,147 A | * | 3/1989 | Hirohata | 411/349 |
| 4,828,444 A | | 5/1989 | Oshida | |
| 5,142,834 A | | 9/1992 | Laclave et al. | |
| 5,291,639 A | | 3/1994 | Baum et al. | |
| 5,332,347 A | * | 7/1994 | Kimisawa | 411/182 |
| 5,507,610 A | * | 4/1996 | Benedetti et al. | 411/339 |
| 5,620,291 A | | 4/1997 | Hayes et al. | |
| 5,651,632 A | * | 7/1997 | Gordon | 403/319 |
| 5,651,634 A | * | 7/1997 | Kraus | 403/408.1 |
| 6,264,393 B1 | * | 7/2001 | Kraus | 403/282 |
| 6,557,832 B2 | * | 5/2003 | Shreiner | 256/65.15 |
| 6,575,682 B1 | | 6/2003 | Dohm et al. | |
| 6,612,795 B2 | | 9/2003 | Kirchen | |
| 6,684,568 B2 | * | 2/2004 | Blume et al. | 49/349 |
| 6,984,096 B2 | * | 1/2006 | Kraus | 411/48 |
| 7,752,720 B2 | | 7/2010 | Smith | |
| 7,891,151 B2 | * | 2/2011 | Sano | 52/506.05 |
| 7,927,050 B2 | * | 4/2011 | Koike | 411/104 |
| 8,403,356 B2 | * | 3/2013 | Tago et al. | 280/728.2 |
| 2007/0292205 A1 | * | 12/2007 | Duval | 403/325 |
| 2013/0272778 A1 | * | 10/2013 | Smith et al. | 403/266 |

* cited by examiner

FASCIA BRACKET WITH QUARTER TURN LOCKING NUT

FIELD

The present disclosure relates to a system and method for coupling a trim component to a sheet metal structure and, more particularly, to a caged nut system configured to couple a plastic trim component to a fastener welded to a sheet metal structure.

BACKGROUND

This section provides background information related to the present disclosure which is not necessarily prior art.

Vehicle bodies are complex assemblies that typically include inner and outer panels coupled to a sheet metal body. Polymer panels, therefore, must be structurally able to securely attach to the sheet metal interior and exterior structures while presenting to the customer an aesthetically pleasing surface. Traditionally, an even gap between components is aesthetically desirable.

SUMMARY

This section provides a general summary of the disclosure, and is not a comprehensive disclosure of its full scope or all of its features.

A system for coupling a trim piece to a sheet metal component is provided. The system includes a T-shaped fastener welded to the sheet metal component. The trim component has first and second bearing surfaces configured to bear against first and second sheet metal bearing surfaces. A rotatable fastener having a generally cylindrical body is provided which defines a cylindrical fastener capturing aperture therein. The cylindrical body defines a side slot configured to accept the T-shaped weld fastener coupled to the first sheet metal bearing surface. The cylindrical interior cavity has a first portion having a first diameter, and a second portion having a second diameter larger than a diameter of the T-shaped weld fastener. The rotatable fastener is rotatable from a first position to a second position to capture the fastener.

According to other teachings, a system for coupling a trim component to a body component having two generally perpendicular bearing surfaces. The system has a T-shaped fastener coupled to the body. The trim piece has first and second exterior bearing surfaces and an interior bearing surface. Defined within the trim piece is a keyway having a lead-in portion. A rotatable fastener having a nut body with a cylindrical body portion is rotatably positioned within the keyway. The body defines a fastener holding aperture and defines a side slot. Additionally, the fastener has an exterior carrying flange configured to bear against the interior bearing surface upon rotation of the nut.

According to another embodiment, a system for coupling a trim component to a sheet metal component is disclosed. The system includes a T-shaped fastener coupled to the sheet metal. The trim piece has first and second sheet metal bearing surfaces, and an interior surface opposite the first surface, the trim piece defines keyway having a circular bearing section. A nut is disposed within the keyway. The nut has first and second flanges disposed on either sides of the keyway. The second flange defines a ramped surface configured to apply forces onto the trim piece when the nut is rotated about the T-shaped fastener.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
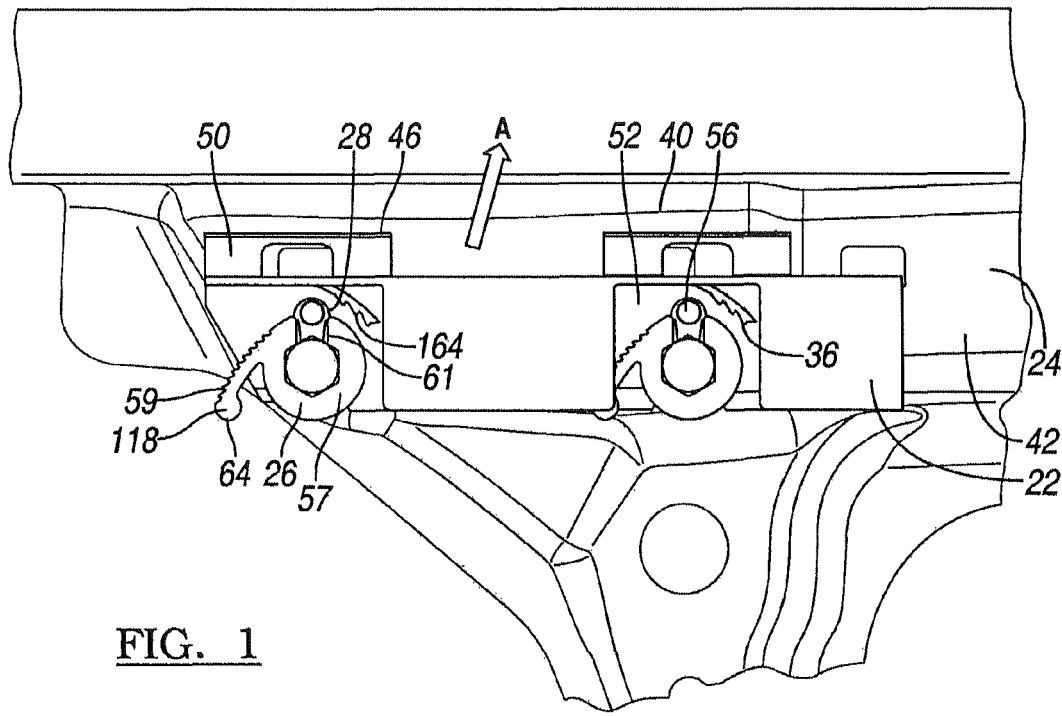
FIG. 1 represents a trim component coupled to a vehicle sheet metal structure according to present teachings.

FIG. 1 represents a front view of the coupling mechanism 20 for coupling a trim component 22 to a sheet metal structure 24 in its engaged position. It is envisioned the trim component 22 would have an aesthetically pleasing exterior surface (not shown) which is being coupled to the sheet metal structure. The coupling mechanism 20 has a rotatable fastener 26 disposed within a keyway 28 defined within a trim component coupling area 30. The trim coupling area 30 has a first bearing member 32 configured to bear against a first bearing surface 34 on the sheet metal structure 24. The rotatable fastener 26 can have a plurality of camming or force producing surfaces which will cause the trim component to be correctly positioned with respect to the sheet metal structure 24. The trim component 22 can have a locking finger 36 which is configured to selectively engage the locking protrusion 38 disposed on the rotatable fastener 26.

FIGS. 2A-5C represent the coupling of the trim component 22 to the sheet metal structure 24. The sheet metal structure 24 has a pair of surfaces 40 and 42 which act as bearing and alignment surfaces for the trim component 22. These surfaces 40, 42 can be perpendicular to each other, or can be set at a fixed angle. The trim component 22 has a similar pair of complimentary surfaces 46 and 48 which are configured to engage the surfaces 40 and 42 of the sheet metal component. One of the coupling surfaces 40 can be formed on a semi-rigid member 50 which can elastically deform a small amount when subjected to an engagement force. The trim component 22 can have an interior surface 52 or a planar member obverse the surface 48.

Figure 2A:
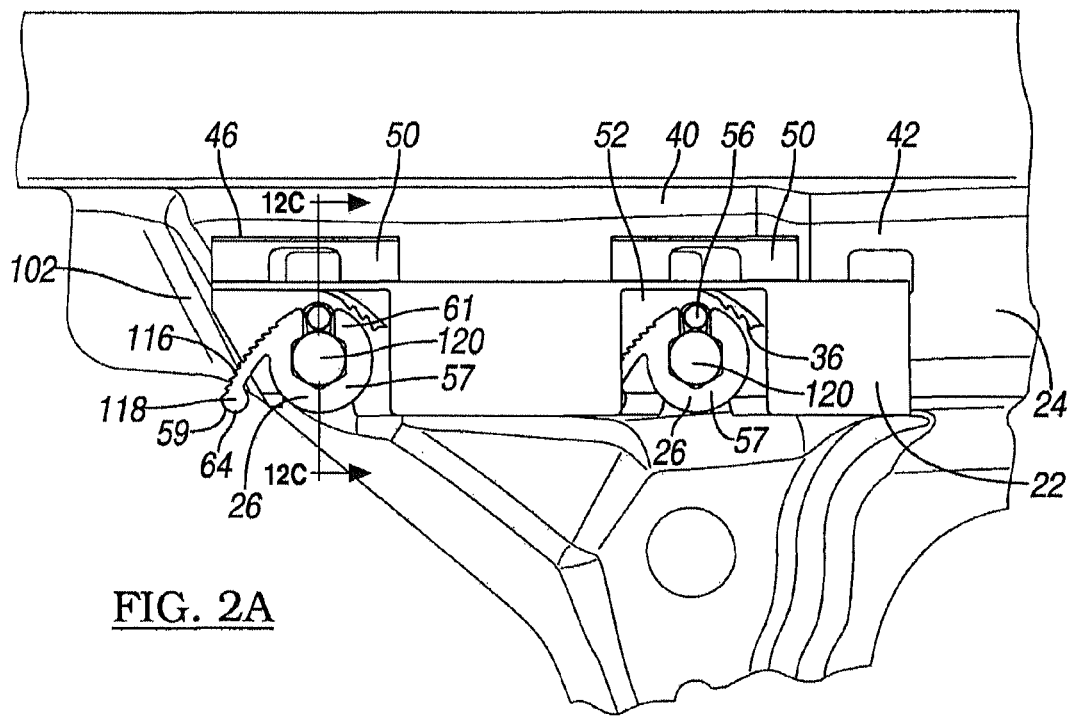
FIGS. 2A-5C represent coupling of the trim component to the sheet metal component.

As shown in FIG. 2A, defined on the member obverse surface 48, the trim component 22 defines a keyway 28 configured to be positioned over the T-shaped stud 56 which is welded to the sheet metal structure 24. As further described below, the trim component 22 is translatable in a first direction "A" generally perpendicular to a slot 61 defined within the rotatable fastener 26. Optionally, the locking finger 36 engages a camming arm 64 disposed on the rotatable fastener 26.

The T-shaped stud 56 is positioned through an aperture defined by the keyway 28. As shown, the trim component 22 can have a pair of coupling mechanisms 20 to couple the trim component 22 to the sheet metal structure 24. The trim component 22 is translated with respect to the sheet metal structure 24, sliding the T-shaped stud 56 within the keyway 28 and into the rotatable fastener 26.

Figure 2B:
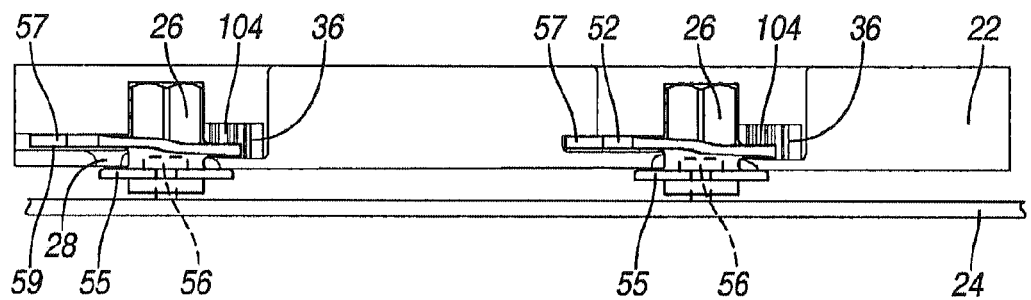

FIG. 2B represents a side view of the coupling of the trim component to the sheet metal structure 24. Shown is the alignment of the two studs with the pair of coupling mechanisms 20. As shown, the rotatable fastener 26 can have a pair of generally circular coupling flanges 56 and 57 which are configured to slidably and rotatably couple to the trim component 22. The first coupling flange 55 is generally planar, while the second flange 57 has a ramped surface 58. Protruding from the second coupling flange 57 is the camming flange surface 59. This camming flange surface 59 can be generally parallel to the first coupling flange 56 and generally perpendicular to the T-shaped stud 56 or parallel to the head 68 of T-shaped stud 56.

Figure 2C:
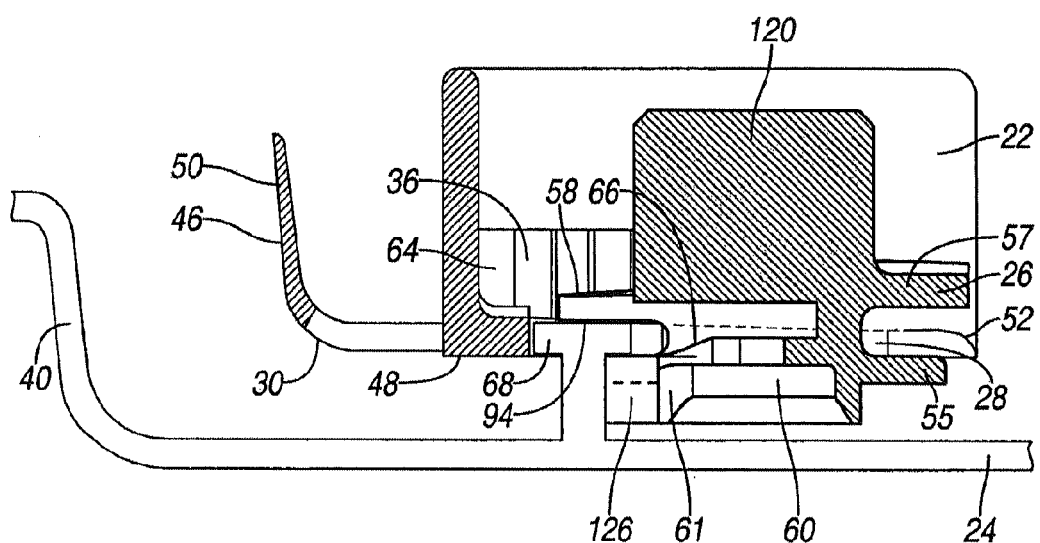

FIG. 2C represents a cross-sectional view of the rotatable fastener 26 disposed within the keyway 28. Shown is a generally cylindrical inner aperture 60 configured to accept the T-shaped stud 56. The aperture 60 has a first portion 62 having a first diameter and a second portion 64 having a second diameter larger than the first diameter. Also shown is a ramped surface 66 which assists in guiding the head portion 68 of the T-shaped stud 56 into the second position 64 of the aperture 68. Fluidly coupled to the aperture 60 is the side slot 61 configured to allow access by the T-shaped stud 56 to the cylindrical inner aperture 60.

Figure 3A:
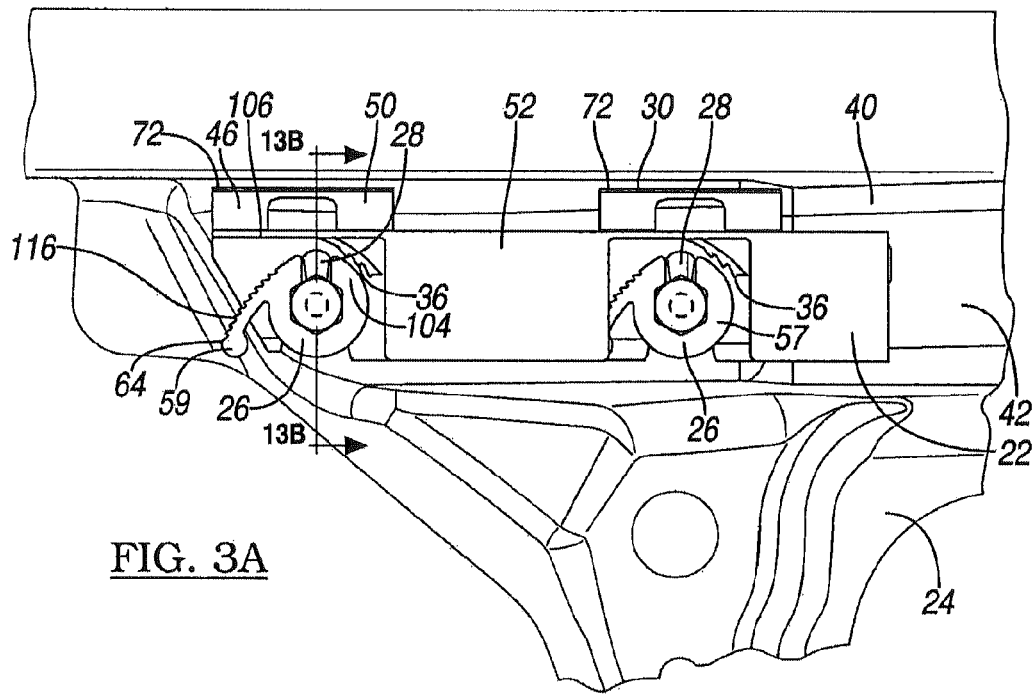

As shown in FIG. 3A, the trim component 22 is slid so as to engage a trim piece bearing surface 72 with the sheet metal. In this position, the T-shaped stud 56 is incorporated into the cylindrical inner aperture 60.

Figure 3B:
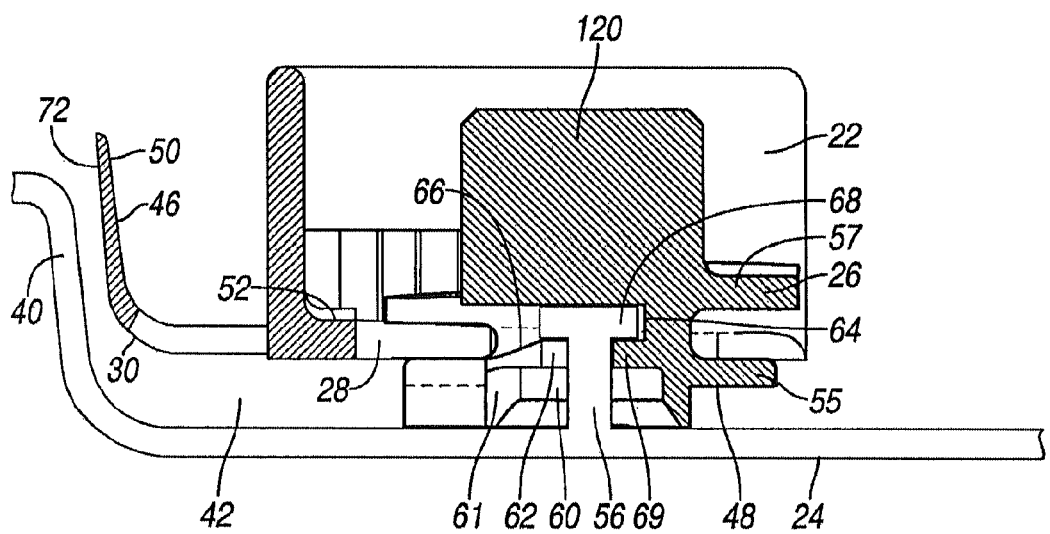

As shown in FIG. 3B, the head 68 of the T-shaped stud 56 is positioned within the second portion 64 of the inner aperture 60. The head 68 of the T-shaped stud 56 passes over the ramped surface 58 so as to position the lower surface 69 of the head portion 68 onto the flange 57 bearing surface.

Figure 4A:
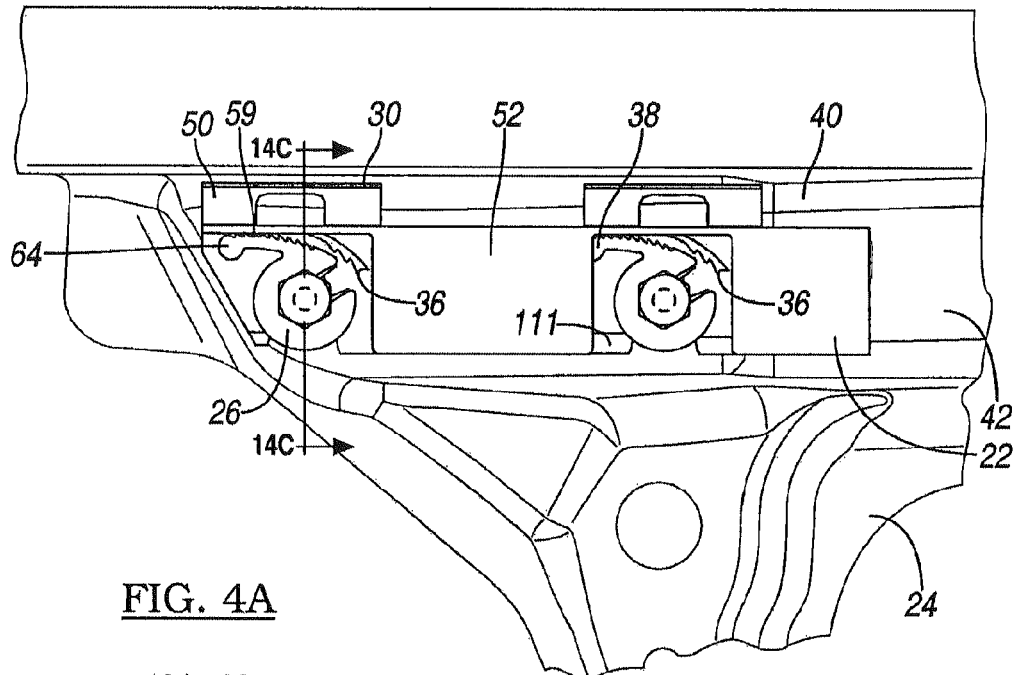
Figure 4B:
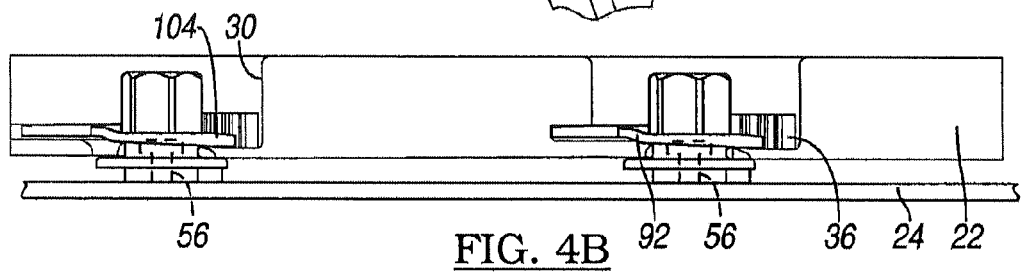

As shown in FIGS. 4A and 4B, the rotatable fastener 26 is rotated, thus capturing the head 68 of the T-shaped stud 56 within the aperture 60. Rotation of the rotatable fastener 26 positions the ramped surface 58 against a bearing surface 94 on the trim component 22.

Figure 4C:
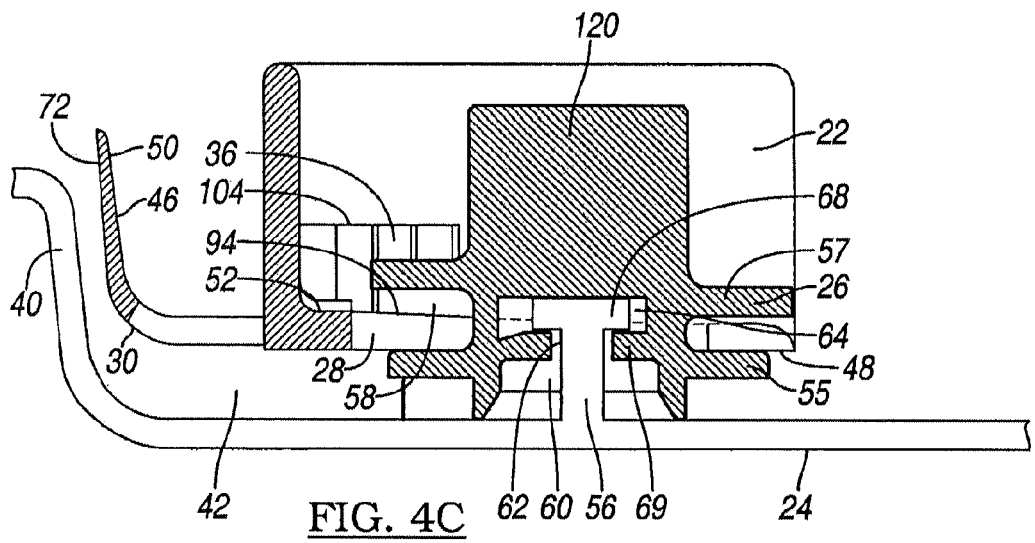
Figure 5A:
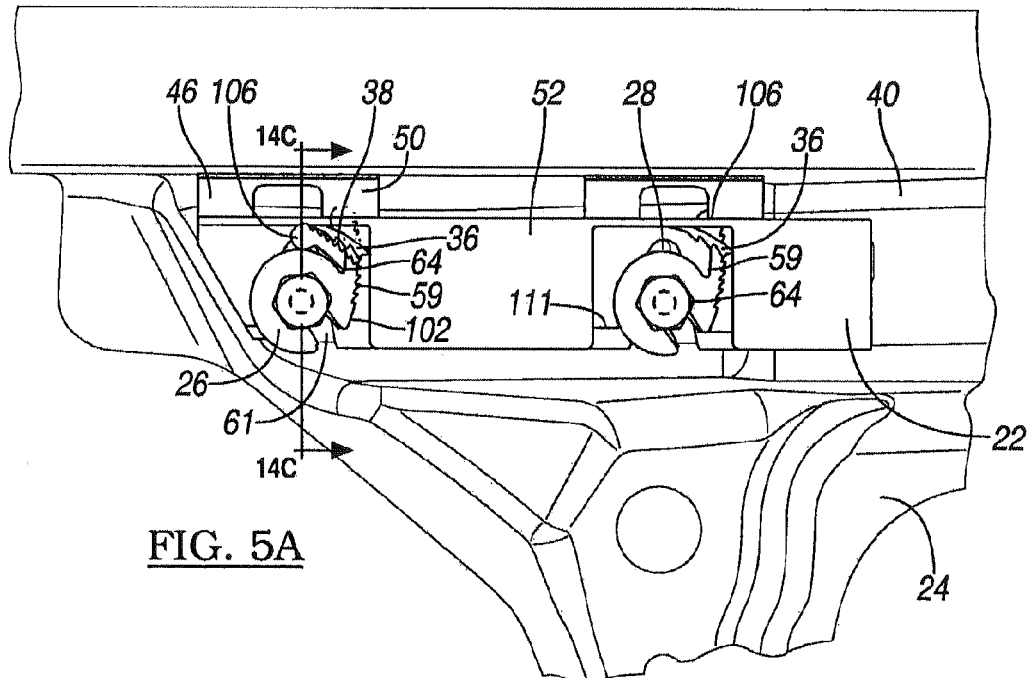
Figure 5B:
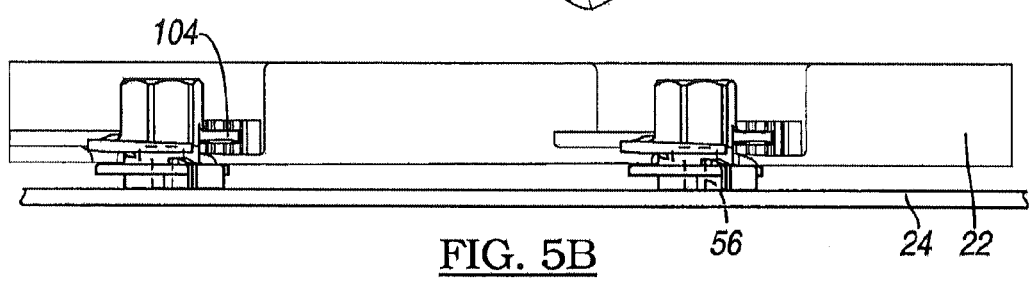
Figure 5C:
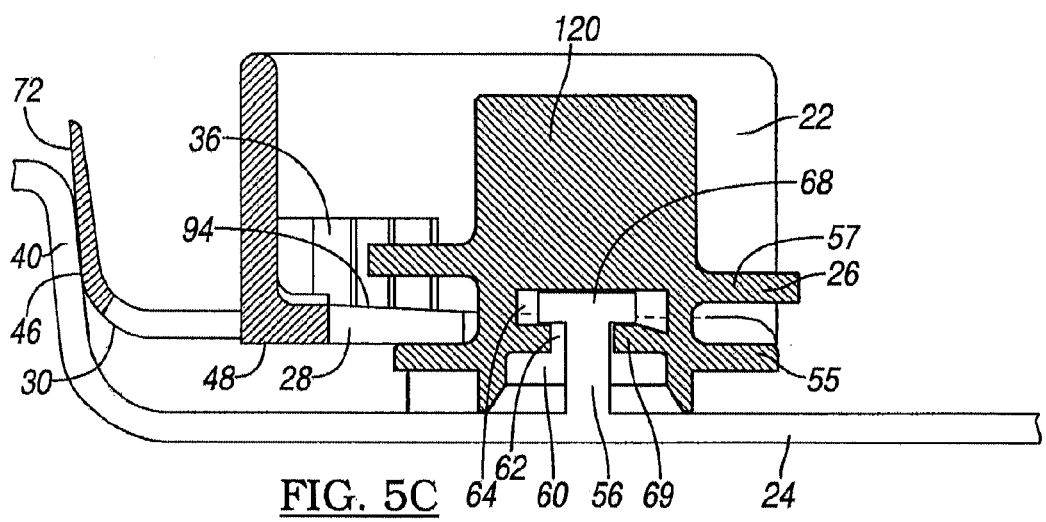

As best seen in FIG. 4C, the rotation of the rotatable fastener 26 captures the T-shaped stud 56 and presses a second trim piece bearing surface 94 against a second sheet metal bearing surface. By continuing to rotate the rotatable fastener 26, the camming arm 64 is rotated and engaged with the locking finger 36 of the trim component 22. As best shown in FIG. 5B, locking teeth 102 and the camming arm 64 engage locking teeth 104 on the deformable finger 36. Optionally, a generally circular end of the camming arm 64 can apply forces against an internal bearing surface 106 of the trim component 22 to force the trim component 22 against the sheet metal structure 24. As shown in FIG. 56, the trim component 22 is pushed into both the first and second sheet metal bearing surfaces.

Figure 6:
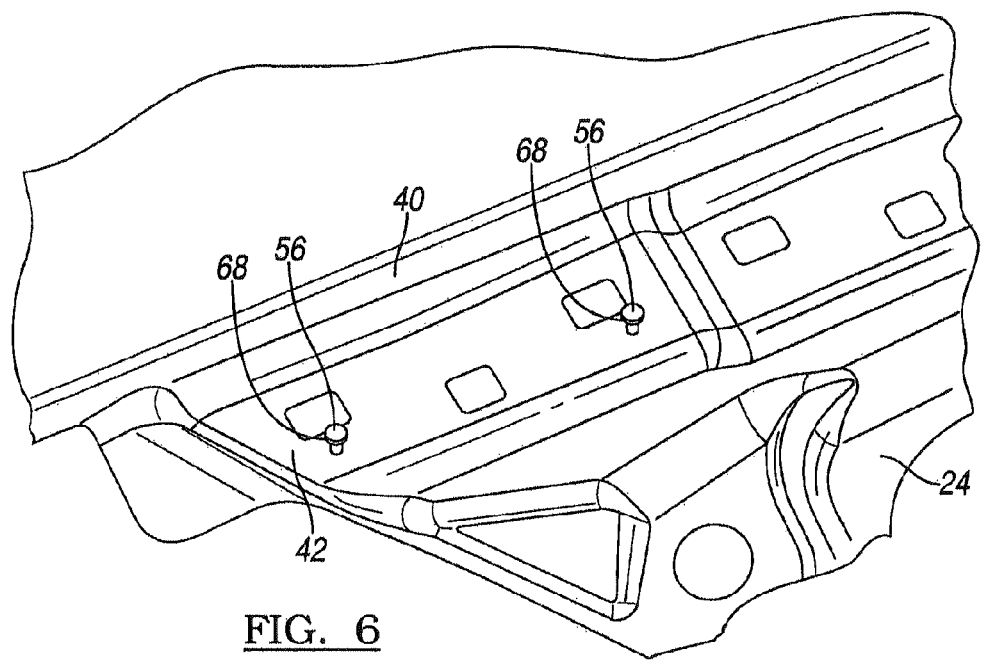
FIG. 6 represents a sheet metal structure showing the FIGS. 1-5.

FIG. 6 represents the sheet metal structure 24. Shown is the pair of generally perpendicular sheet metal bearing surfaces 40 and 42. Also shown is a pair of T-shaped weld fasteners 56 which extend generally perpendicular to one of the surfaces. As shown, the head of the T-shaped fastener is spaced away from the coupling surface.

Figure 7:
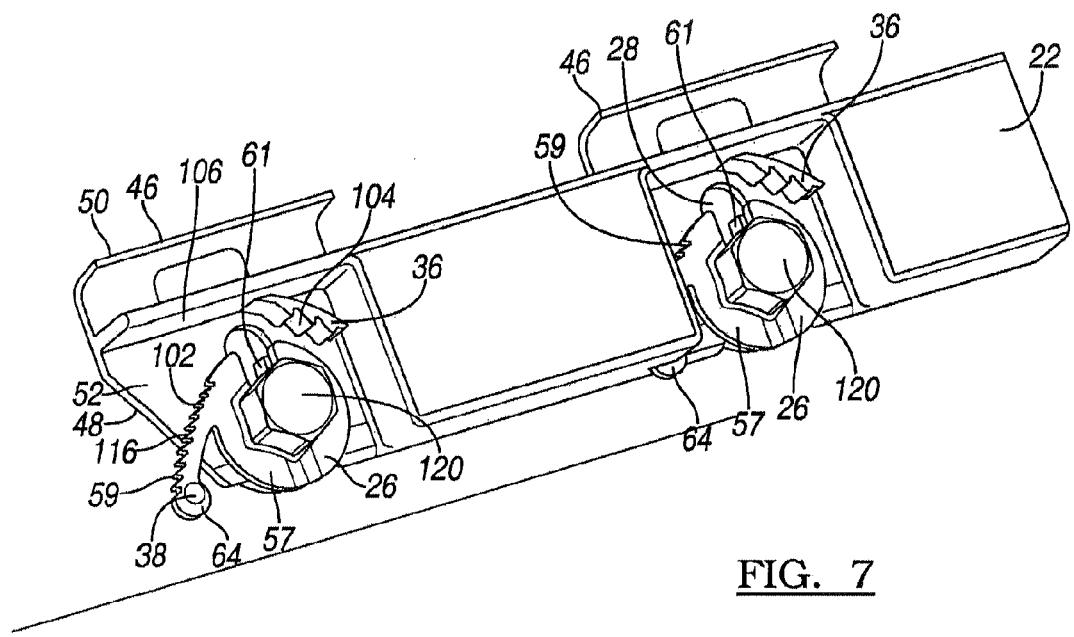
FIG. 7 represents a trim component showing FIGS. 1-5.
Figure 8A:
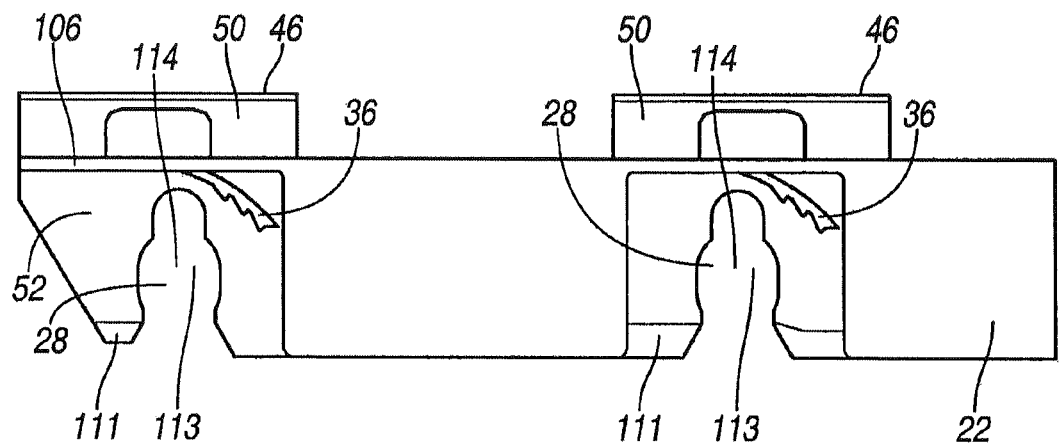
FIGS. 8A and 8B represent the trim component showing FIG. 7 with a retainable fastener according to the present teachings.
Figure 8B:
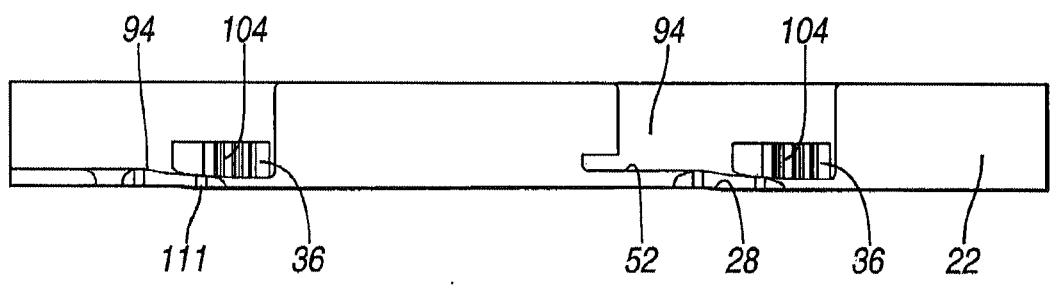

FIG. 7 and FIGS. 8A and 8B represent a perspective view of the trim component 22. Shown is the first and second bearing surfaces configured to bear against the first and second sheet metal bearing surfaces. Shown defined within the trim component 22 is the keyway 28 which rotatably supports the rotatable fastener 26. The rotatable fastener 26 has a generally cylindrical body defining the cylindrical aperture 60. The cylindrical body defines the side slot 61 which accepts the T-shaped stud 56.

Shown in FIGS. 8A and 8B is the ramped lead-in portion 111 for the keyway 28. The keyway 28 additionally has a generally elliptical rotatable fastener holding portion 113 and the aperture 114. Also shown is the relationship of the locking finger 36 and the interior cam engaging surface. Shown in FIG. 8B is the second ramped surface 65 which engages the bearing surface 63 of the first coupling flange 54 of the rotatable fastener 26.

Figure 9:
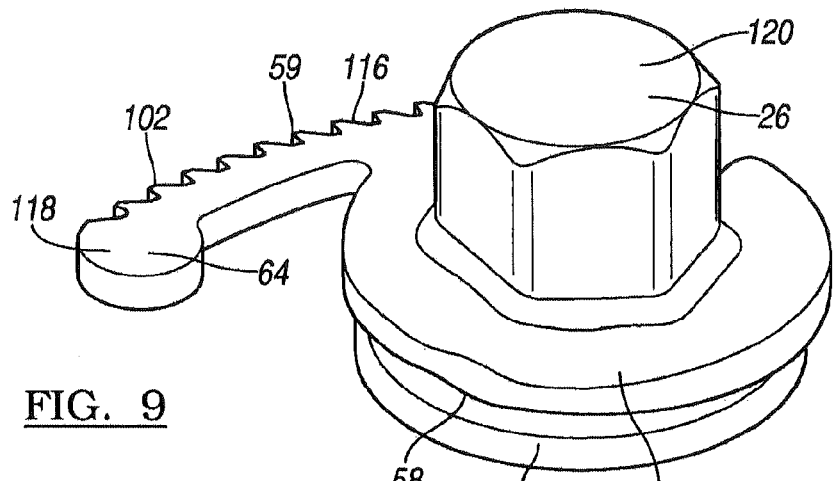
FIG. 9 represents a first perspective view of the rotatable fasteners shown in FIGS. 1-5.
Figure 10A:
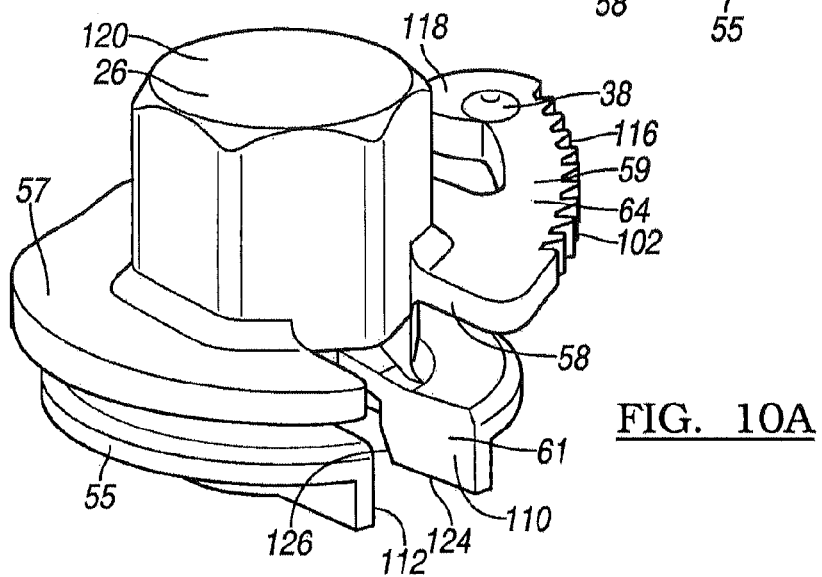
FIGS. 10A and 10B represent a second perspective view of the rotatable fasteners shown in FIGS. 1-5.
Figure 10B:
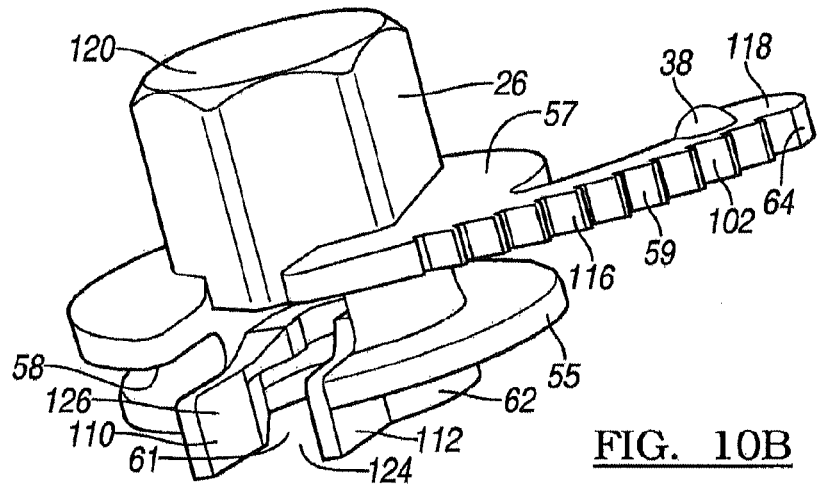
Figure 11:
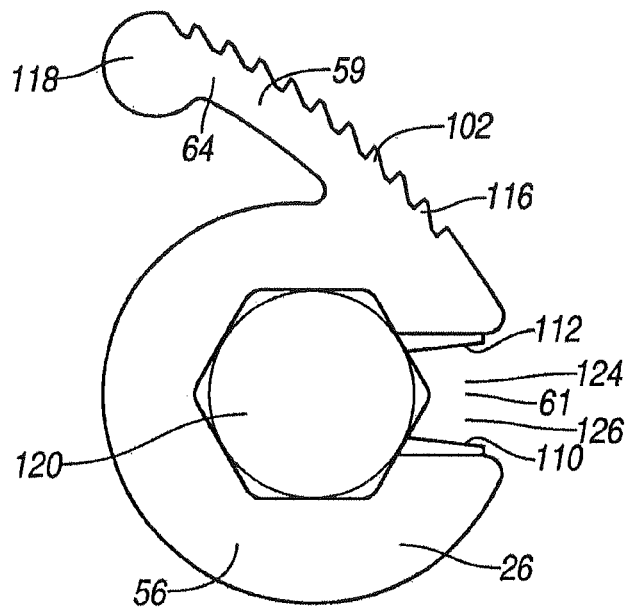
FIG. 11 represents a top view of the rotatable fastener shown in FIG. 10.

FIGS. 9-16 represent various perspective views of the rotatable fastener 26 according to the present teachings. Shown in FIG. 9 is the generally cylindrical body 120 having the assembled coupling features. The top portion can have a plurality of planar flanged surfaces 122 or a hex-shaped aperture 123 which can be used to engage a tool. The first flange 55 defines a slot 124 and lead-in portion 126. The lead-in portion 126 can have a pair of opposed ramped surfaces 110 and 112. These surfaces can guide the body of the T-shaped stud 56 in instances when the rotatable fastener 26 is not properly aligned with the T-shaped stud 56. Optionally, the second flange can have a slot defined therein.

Figure 12:
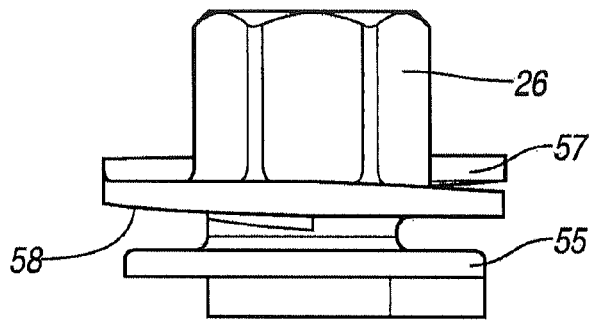
FIGS. 12 and 13 represent side views of the rotatable fastener according to the present teachings.
Figure 13:
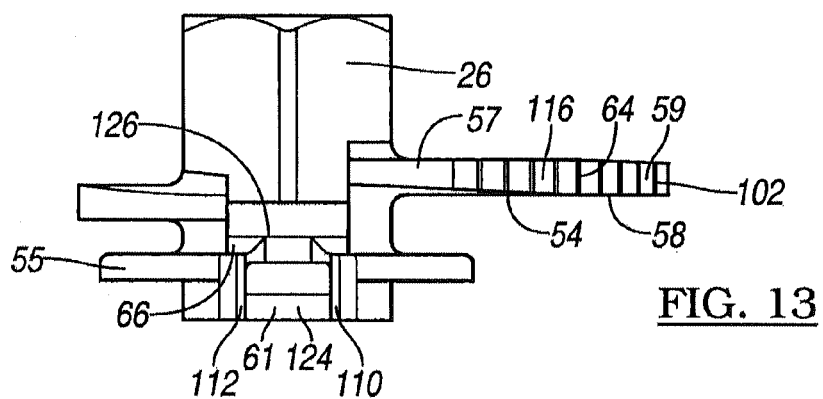

As best seen in FIGS. 9-13, the second coupling flange 57 has the depending camming arm 64. The camming arm 64 has a toothed exterior surface 116 and a circular camming surface 118 which is configured to engage locking teeth on the trim. As shown in FIGS. 12 and 13, the upper flange can have a generally helical or ramped configuration. This configuration defines the ramped surface of the second coupling flange.

Figure 14:
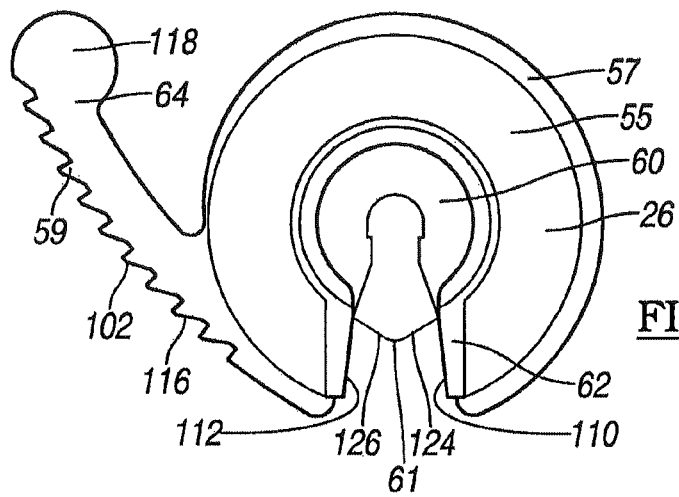
FIG. 14 represents a bottom view of the rotatable fastener shown in FIGS. 12 and 13.

As shown in FIGS. 12 and 13, the first and second coupling flanges 55 and 57 form a pair of generally parallel planes. The second coupling flange 57 has a generally helical bearing surface 52 which applied force onto the trim component 22 when rotated. As best seen in FIG. 14, the distance between the first and second coupling flanges 55 and 57 varies radially from a minimum at the first surface 112 to a maximum at the second surface 110.

Figure 15:
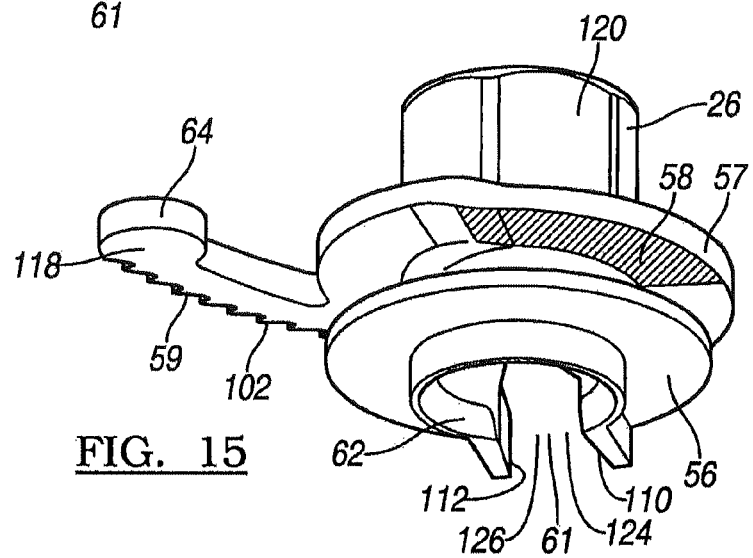
FIG. 15 represents a perspective view of the rotatable fastener shown in FIG. 14.
Figure 16:
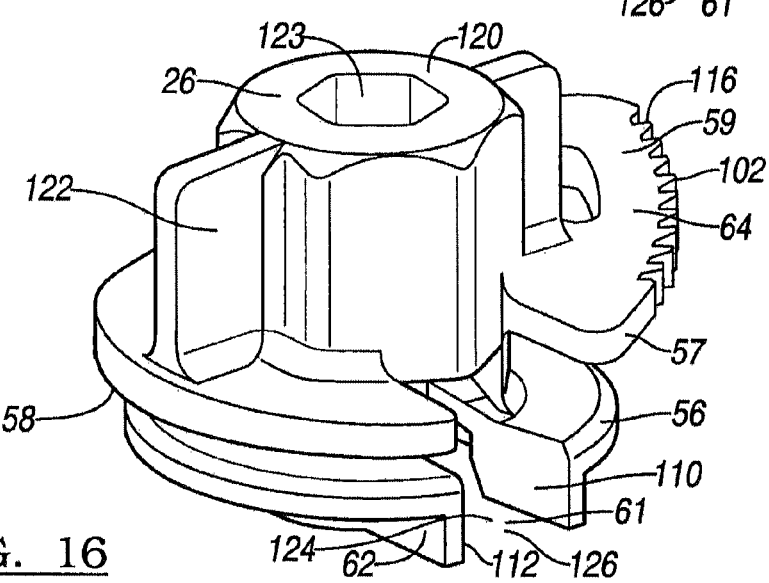
FIG. 16 represents a perspective view of an alternate nut according to the present teachings.
Figure 17A:
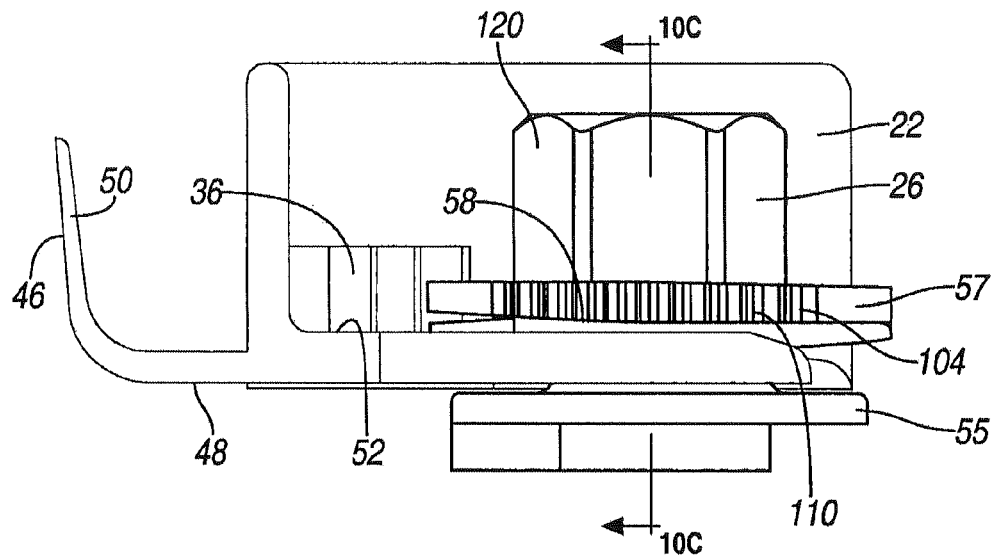
FIGS. 17A-17D represent side views of the nut engaged with the trim component.
Figure 17B:
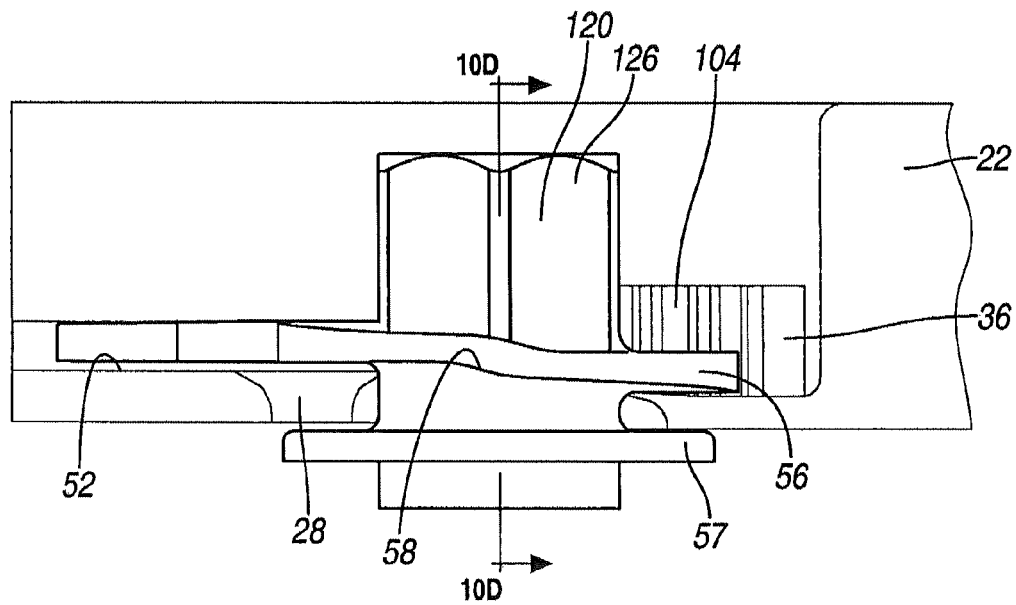
Figure 17C:
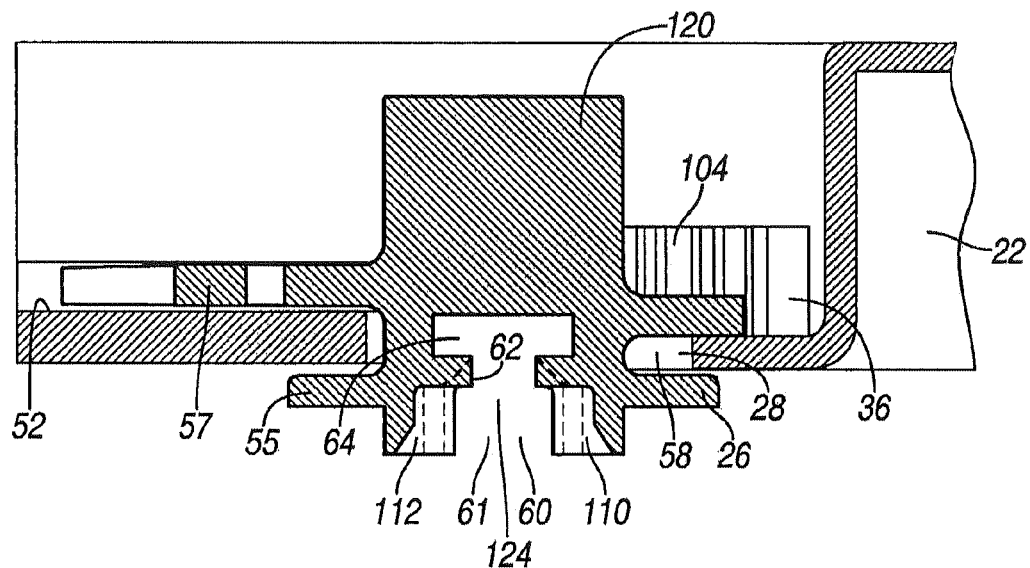
Figure 17D:
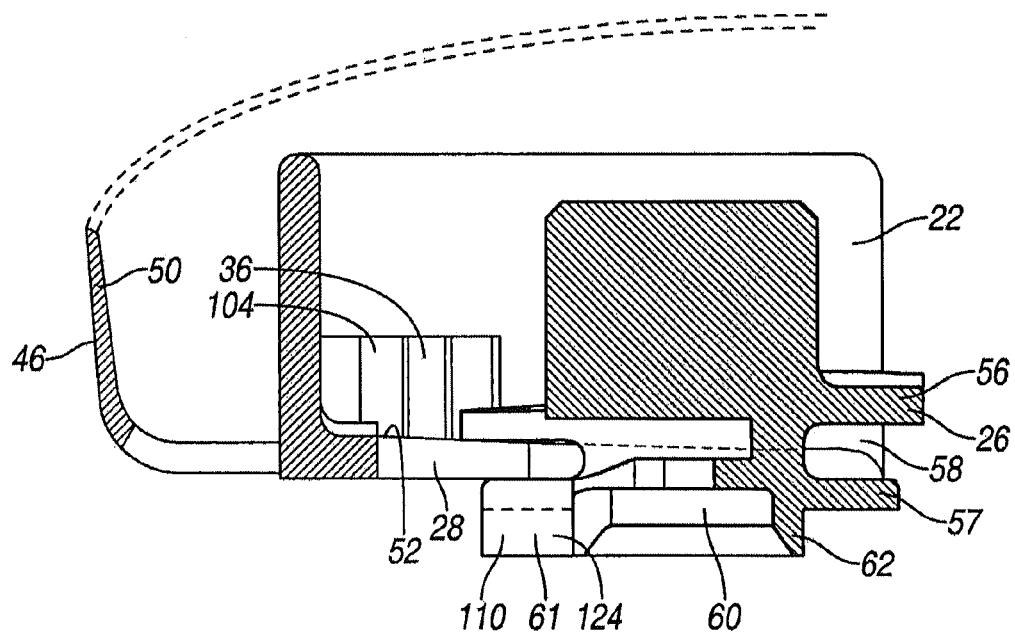

FIGS. 14 and 15 represent bottom and perspective views of the side slot 61 cylindrical central aperture 60. Shown is a bottom flange 62 which bears against the trim component 22. The bottom flange 62 functions to locate the first flange 55 with respect to the bearing surface of the trim component 22.

FIGS. 17A-17D represent the interaction of the bearing surfaces of the rotatable fastener 26 with various bearing surfaces of the trim component. As shown, rotation of the rotatable fastener 26 applies force onto the interior surface of the trim component 22 while the camming arm 64 presses the trim component into the second sheet metal surface. It should be noted that the trim component 22 shown in FIGS. 1-17D can have a Class A surface which engages the sheet metal structure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for coupling a trim component to a sheet metal structure, the system comprising:
    a T-shaped weld fastener coupled to a first surface of the sheet metal structure;
    a trim piece having a first exterior bearing surface configured to bear against the first sheet metal bearing surface, and a second exterior surface configured to bear against the second sheet metal surface, and an interior bearing surface generally opposed to the first trim bearing surface, and a second interior bearing surface opposite the second exterior trim bearing surface, said trim piece defining a keyway slot having a first generally circular bearing section; and
    a fastener rotatably disposed within the keyway, the fastener having a first flange disposed on the first side of the keyway and a second flange disposed on an opposite side of the keyway, the second flange defining a ramped surface configured to apply forces on the trim piece when the fastener is rotated about the T-shaped fastener from the first position to the second position.

2. The system according to claim 1, wherein the first generally circular bearing section of said keyway defines a ramp surface configured to engage the ramp surface of the fastener.

3. The system according to claim 2, wherein the fastener comprises a flange disposed generally perpendicular to a cylindrical portion centerline, said flange having a camming bearing surface being generally parallel to the centerline, the camming bearing surface configured to apply force to the trim piece when the fastener is rotated from the first position to the second position.

4. The system according to claim 3, wherein rotation of the fastener from the first position to the second position applies forces to cause the trim piece to bear against one of the first or second sheet metal bearing surfaces.

5. A system for coupling a trim component to a sheet metal structure having a first bearing surface and a second bearing surface oriented substantially perpendicular to said first bearing surface, the system comprising:
    a mounting stud coupled to said first bearing surface and projecting substantially normal therefrom;
    a trim piece having a first exterior bearing surface configured to bear against the first bearing surface of said sheet metal structure and a second exterior bearing surface oriented substantially perpendicular to said first exterior bearing surface and configured to bear against the second bearing surface of said sheet metal structure, said trim piece having a fastener coupling area comprising a keyway configured to receive said mounting stud and at least one wall extending substantially parallel to said second exterior bearing surface; and a fastener rotatably disposed within said fastener coupling area and configured to rotate about said mounting stud when received within said keyway; said fastener having a camming arm for applying a radial force on said at least one wall to move said trim piece laterally and press said second exterior bearing surface of said trim piece against said second bearing surface of said sheet metal structure when said fastener is rotated from a first position to a second position.

6. The system of claim 5, wherein said camming arm has locking teeth formed thereon that are configured to engage a locking structure on said at least one wall to lock said fastener in said second position.

7. The system of claim 5, wherein said mounting stud comprises a T-shaped stud having an enlarged head portion, and further wherein said fastener has an internal flange for engaging an underside of said enlarged head portion and a first external flange defining a ramp surface configured to apply an axially directed force on said trim piece to move said trim piece in said axial direction and press said first exterior bearing surface of said trim piece against said first bearing surface of said sheet metal structure when said fastener is rotated from said first position to said second position.

8. The system according to claim 7, wherein the trim piece defines a ramp surface configured to engage the ramp surface of the fastener.

9. The system according to claim 7, wherein said first external flange of said fastener is disposed on a first side of said trim piece and said fastener further has a second external flange spaced axially from said first external flange and disposed on an opposite side of said trim piece.

10. The system according to claim 9, wherein the fastener coupling area of said trim piece has a circular bearing section adjacent said keyway having a ramp surface configured to engage the ramp surface of the fastener.

\* \* \* \* \*